United States Patent Office 3,769,434
Patented Oct. 30, 1973

3,769,434
INHALATION ANESTHETIC OR ANALGESIC
METHOD AND COMPOSITION
Ross C. Terrell, Plainfield, N.J., assignor to
Airco, Inc., New York, N.Y.
No Drawing. Filed July 2, 1971, Ser. No. 159,529
Int. Cl. A61b 27/00
U.S. Cl. 424—342
3 Claims

ABSTRACT OF THE DISCLOSURE

The present invention relates to the novel compound 1,1,2,2-tetrafluoroethyl fluoromethyl ether ($CHF_2CF_2OCH_2F$)

The compound is prepared through selective stepwise chlorination and fluorination of 1,1,2,2-tetrafluoroethyl methyl ether. The compound is useful as an anesthetic and as a solvent and dispersant for fluorinated materials. The compound has the unusual property of causing an analgesic effect on mammals at subanesthetic concentrations.

---

This invention relates to 1,1,2,2-tetrafluoroethyl fluoromethyl ether and its use in producing analgesia and anesthesia in anesthetic-susceptible air-breathing mammals. This ether has the unusual property of causing analgesia before its anesthetic effect is significantly apparent on such mammals.

The compound 1,1,2,2-tetrafluoroethyl fluoromethyl ether has the following formula:

$$CHF_2CF_2OCH_2F$$

This ether is normally a clear, colorless liquid with no significant odor. The compound has the following physical properties: B.P. 53° C. at 760 mm.; vapor pressure 270 mm. at 25° C.; specific gravity 1.4; and molecular weight 150. The compound is nonflammable, soda lime stable, and an analgestic and anesthetic for inhalation anesthetic-susceptible mammals.

1,1,2,2 - tetrafluoroethyl fluoromethyl ether is readily miscible with other organic liquids including fats and oils and has useful solvent properties, for example as a solvent for fluorinated olefins and other fluorinated materials such as fluorowaxes. The ether can be used to prepare pastes and dispersions of such fluorine-containing materials, useful for coatings and the like and as degreasing agents.

The compound of the present invention can be prepared through the selective stepwise chlorination and fluorination of 1,1,2,2-tetrafluoroethyl methyl ether ($CHF_2CF_2OCH_3$), according to the following equations:

$$CHF_2CF_2OCH_3 + Cl_2 \rightarrow CHF_2CF_2OCH_2Cl + HCl$$

$$CHF_2CF_2OCH_2Cl + KF \rightarrow CHF_2CF_2OCH_2F + KCl$$

The starting material $CHF_2CF_2OCH_3$ is a well known, readily available material which can be prepared by reacting methanol with tetrafluoroethylene in the presence of sodium hydroxide and α-pinene in an autoclave at 300–500 p.s.i. and 40° C.

$$CH_3OH + CF_2=CF_2 \rightarrow CHF_2CF_2OCH_3$$

The compound $CHF_2CF_2OCH_3$ can be separated from the reaction mixture by fractional distillation at 36.5°–37° C. at 760 mm.

In the chorination of $CHF_2CF_2OCH_3$ the methyl group undergoes selective addition of chlorine. The product can be obtained by controlling the reaction parameters and the rate of addition of chlorine. The extent of chlorination can be monitored by determining the amount of hydrogen chloride which is liberated during the reaction. The hydrogen chloride can be collected in a water scrubber which is titrated with standard base to determine the amount of hydrogen chloride. In preparing $$CHF_2CF_2OCH_2Cl,$$

the chlorination should be carried out until 1 mole of hydrogen chloride is detected per mole of $CHF_2CF_2OCH_3$ reacted.

The chlorination of $CHF_2CF_2OCH_3$ to form $$CHF_2CF_2OCH_2Cl$$

should be carried out in either a fully or partially transparent vessel so that photo energy can be supplied to the reaction. Suitable sources of photo energy are incandescent, ultraviolet, and fluorescent lamps, and even strong sunlight. In view of the ready availability, low cost and ease of handling of incandescent lamps, they are preferred for use as the illumination source.

The chlorination reaction can be accomplished by bubbling gaseous chlorine into the liquid $CHF_2CF_2OCH_3$ while it is strongly illuminated. The chlorine is added at the same rate at which it reacts which can be determined by checking for chlorine vapor in the effluent from the chlorinator. The reactor is exothermic so cooling water should be supplied to the chlorination apparatus to control the reaction. The chlorination can be carried out at any temperature from 15° C. up to the boiling point of the chlorination mixture. Best results are usually found at 25°–35° C. where the reaction rate is fast enough and the formation of by-products does not present a serious problem. Following the chlorination the reaction mixture can be separated by fractional distillation or by vapor phase chromatography.

In order to prepare 1,1,2,2-tetrafluoroethyl fluoromethyl ether, a sample of $CHF_2CF_2OCH_2Cl$ prepared according to the previously described manner can be transferred to a reaction vessel that will not be attacked during the fluorination reaction. A glass, stainless steel, copper, nickel, or platinum vessel would be quite suitable. In the reaction potassium fluoride can be added to a solvent such as N-methyl pyrrolidone and the mixture dried by distilling out any water present. $CHF_2CF_2OCH_2Cl$ is then added to the mixture while maintaining it at an elevated temperature, for instance at about 150 to 250° C., preferably about 190 to 200° C. Higher or lower temperatures can be employed; however, it has been found that higher temperatures tend to produce undesirable reaction products while lower temperatures can cause a slow rate of reaction. The desired reaction product can be readily separated from the reaction mixture by fractional distillation.

The following examples illustrate the preparation of 1,1,2,2-tetrafluoroethyl fluoromethyl ether.

EXAMPLE I

Preparation of the intermediate $CHF_2CF_2OCH_3$

Tetrafluoroethylene (500 g.) was added as a gas at 300–500 p.s.i. to a stirred one liter autoclave containing a solution of sodium hydroxide (25 g.) in methanol (300 cc.) and also a small amount of α-pinene (10 g.). The autoclave was heated to 40° C. to initiate the reaction. The reaction then proceeded smoothly with a slight exotherm and was maintained at 35°–45° C. The crude product was washed with water and then fractionally distilled to obtain 554 g. of $CHF_2CF_2OCH_3$, B.P. 36.5°–37° C. at 760 mm.

EXAMPLE II

Preparation of $CHF_2CF_2OCH_2Cl$

Approximately 200 g. (1.52 moles) of $CHF_2CF_2OCH_3$, prepared essentially as illustrated in Example 1, were added to a water-jacketed chlorinator fitted with a thermometer, a "Dry Ice" cold finger-type condenser and a fritted glass gas dispersion tube. The reaction was illuminated with a 250 watt incandescent bulb and was maintained at 30° C. while chlorine gas was slowly bubbled into the solution. The course of the reaction was followed by titration of the effluent HCl and was stopped when 1 mole of HCl per mole of starting ether had been titrated. Fractional distillation gave 170 g. of $CHF_2CF_2OCH_2Cl$, B.P. 76° C. at 760 mm.

Calculated for $C_2H_3ClF_4O$ (percent): C, 21.6; H, 1.81. Found (percent): C, 21.9; H, 1.99.

EXAMPLE III

Preparation of $CHF_2CF_2OCH_2F$

Potassium fluoride (100 g.) was added to N-methyl pyrrolidone (500 cc.) and the mixture dried by distilling out 50 cc. of the solvent. $CHF_2CF_2OCH_2Cl$ (100 g.) was then added slowly to the mixture with stirring while holding the reaction mixture at 200° C. The $$CHF_2CF_2-O-CH_2F$$

product was distilled out of the reaction mixture as it was formed, and was condensed and purified by preparative gas chromatography, B.P. 53° C.

Calculated formulation $C_3H_3F_5O$ (percent): C, 24.0; H, 2.0. Found (percent): C, 23.9; H, 1.6.

In order to determine the usefulness of 1,1,2,2-tetrafluoroethyl fluoromethyl ether as an inhalation anesthetic in respirable mixtures containing a life-supporting amount of oxygen, a series of tests was carried out employing mice. The compound tested was at least 99.5% pure as determined by vapor phase chromatography.

Groups of 5 mice were placed in a jar and exposed to a concentration of 2.5 to 8% by volume of 1,1,2,2-tetrafluoroethyl fluoromethyl ether. The results of these tests were as follows:

| No. of animals | Inhalant conc., percent | Induction time, sec. | Recovery time, sec. | Remarks |
|---|---|---|---|---|
| 5 | 2.5 | | | No anesthesia, some analgesia present,[1] no loss of righting reflex |
| 5 | 5 | | | No loss of righting reflex. Analgesia lasting c. 40s.[1] Some scratching of face, possible irritant |
| 5 | 8 | 47 | 44 to pain; 56 to walk[1] | ([2]) |

[1] Tail clip test=Reaction to pain caused by clipping tail.
[2] Smooth induction, light during maint. with occasional limb movements. No resp. depression detected. Squeaking during recovery.

The compound 1,1,2,2-tetrafluoroethyl fluoroethyl ether appears to exhibit light or low potency anesthetic properties in inhalation anesthetic-susceptible mammals, and thus its use may be particularly desirable where more control over the patient is desired. The compound is unusual in causing analgesia prior to exhibiting the anesthetic effect. The compound is non-flammable and soda lime stable, and lends itself well to effective use as an inhalant analgesic and anesthetic in respirable mixtures containing life-supporting concentrations of oxygen.

The effective amounts of the ether compound of this invention to be employed depends upon the level of anesthesia to which the mammal is to be brought, the rate at which anesthesia is to be induced, and the length of time over which anesthesia is to be maintained. Minor volume percentages of the ether compound of at least several percent, e.g. about 5 to 15, preferably about 8 to 12%, can be used in respirable mixtures containing life-supporting amounts of oxygen. The person controlling the anesthesia can easily regulate the amount and gradually increase the amount until the desired plane of anesthesia is reached. By then monitoring the physical reactions of the mammal, as is the usual procedure, the duration and plane of anesthesia can be readily controlled. Lesser amounts of the ether compound can be employed along with oxygen where only an analgesic effect is desired.

It should be understood that the foregoing disclosure relates only to preferred embodiments of the invention and that it is intended to cover all changes and modifications of the examples of the invention herein chosen for the purpose of the disclosure which do not constitute departure from the spirit and scope of the invention.

It is claimed:

1. The method of causing anesthesia in a warm blooded, air-breathing mammal comprising administering to said mammal by inhalation an anesthetically effective amount of 1,1,2,2-tetrafluoroethyl fluoromethyl ether as an inhalation anesthetic while administering life-supporting amounts of oxygen.

2. The method of causing analgesia in a warm blooded, air-breathing mammal comprising administering to said mammal by inhalation an analgesically-effective amount of 1,1,2,2-tetrafluoroethyl fluoromethyl ether as an inhalation analgesic while administering life-supporting amounts of oxygen.

3. An inhalant anesthetic and analgesic composition comprising 1,1,2,2-tetrafluoroethyl fluoromethyl ether and oxygen in suitable proportions for use as an anesthetic or analgesic.

References Cited

Larsen, Fluorine Chemistry Review, vol. 3 (1969) p. 38.

JEROME D. GOLDBERG, Examiner

U.S. Cl. X.R.

260—614 F